United States Patent [19]

Fugleberg et al.

[11] Patent Number: 4,698,139
[45] Date of Patent: Oct. 6, 1987

[54] HYDROMETALLURGICAL METHOD FOR TREATING VALUABLE METAL RAW MATERIALS CONTAINING CHLORIDES AND FLUORIDES

[75] Inventors: Sigmund P. Fugleberg, Pori; Jaakko I. Poijärvi, Vanha-Ulvila, both of Finland

[73] Assignee: Outokumpu Oy, Helsinki, Finland

[21] Appl. No.: 816,951

[22] Filed: Jan. 6, 1986

Related U.S. Application Data

[63] Continuation of Ser. No. 660,518, Oct. 12, 1984.

[30] Foreign Application Priority Data

Oct. 21, 1983 [FI] Finland .................................. 833869

[51] Int. Cl.⁴ ........................... C25C 1/16; C22B 3/00
[52] U.S. Cl. ........................... 204/112; 204/105 R; 204/105 M; 204/108; 204/119; 75/2; 75/97 A; 75/101 R; 75/108; 75/115; 75/117; 75/119; 75/120; 75/121; 423/36; 423/41; 423/45; 423/52; 423/106; 423/109; 423/146; 423/150; 423/166; 423/482; 423/484; 423/DIG. 2
[58] Field of Search .................. 204/108, 119, 105 M, 204/105 R, 112; 75/2, 115, 117, 108, 119, 101 R, 120, 97 A, 121; 423/146, 482, 483, 484, DIG. 2, 36, 41, 45, 52, 66, 109, 150, 166

[56] References Cited

U.S. PATENT DOCUMENTS

| | | | |
|---|---|---|---|
| 1,403,065 | 1/1922 | Avery et al. | 204/119 |
| 2,454,142 | 11/1948 | Ellsworth | 204/119 |
| 4,220,627 | 9/1980 | Fugleberg et al. | 423/146 |
| 4,263,109 | 4/1981 | Swinkels et al. | 204/119 |
| 4,379,037 | 5/1983 | Bolton et al. | 204/119 |
| 4,383,979 | 5/1983 | Rastas et al. | 423/146 |
| 4,452,762 | 6/1984 | Fugleberg et al. | 423/54 |

*Primary Examiner*—Robert L. Stoll
*Attorney, Agent, or Firm*—Brooks Haidt Haffner & Delahunty

[57] ABSTRACT

The purpose of the method is to remove chlorides and fluorides from a valuable metal raw material by leaching the raw material into sulphuric acid solution and by crystallizing the valuable metal sulphate selectively out of the solution. The valuable metal sulphate crystals are washed in sulphuric acid solution, and the recovered dechlorinated and defluorinated crystals are leached into water and conducted into electrolysis. The sulphuric acid solution employed in the raw material leaching and in the crystal washing is preferably the same as the return acid of the electrolysis. Chlorides and fluorides are removed from the mother liquor of crystallization in the bleed.

1 Claim, 1 Drawing Figure

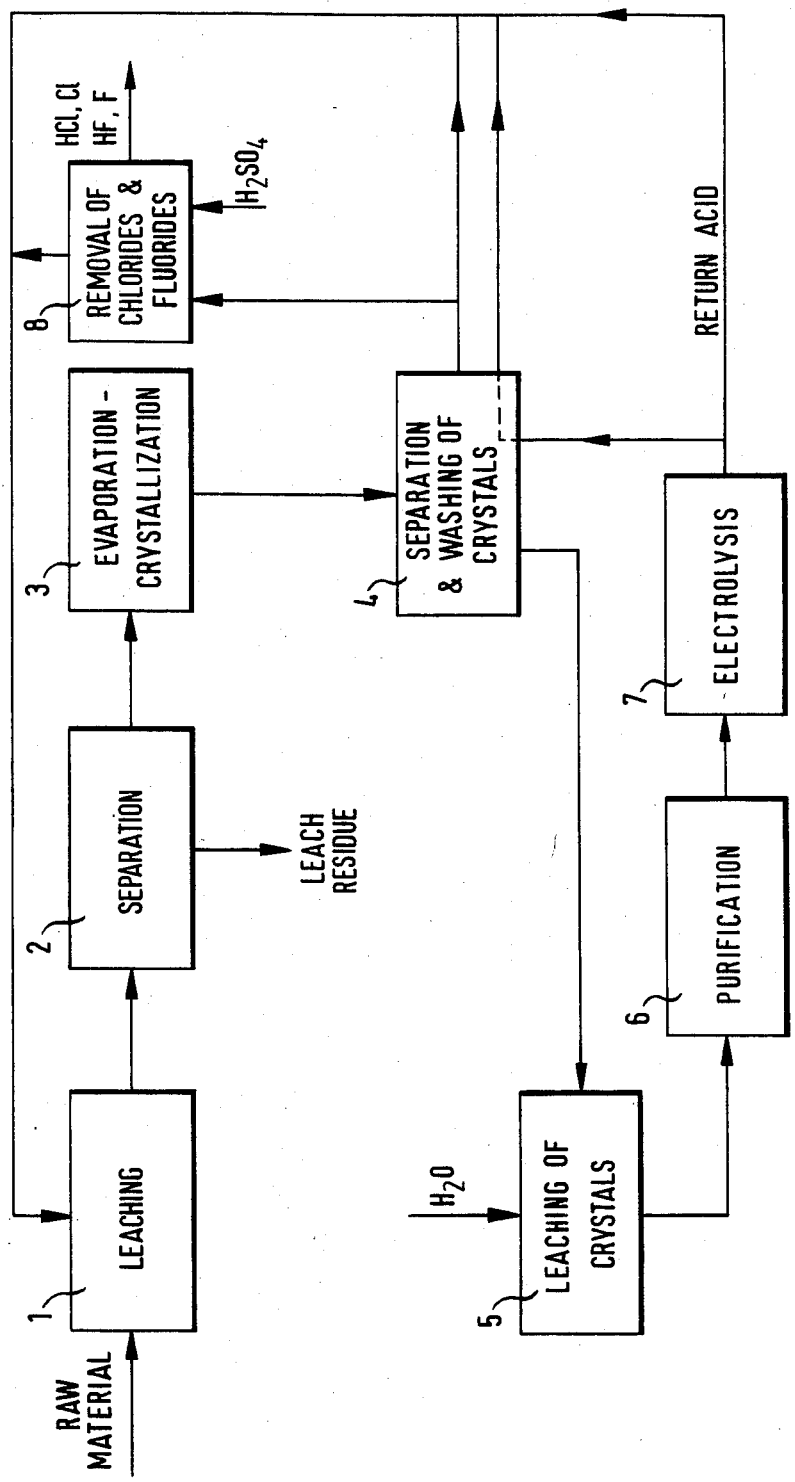

HYDROMETALLURGICAL METHOD FOR TREATING VALUABLE METAL RAW MATERIALS CONTAINING CHLORIDES AND FLUORIDES

This application is a continuation of application Ser. No. 660,518, filed Oct. 12, 1984.

The purpose of the method of the present invention is to remove chlorides and fluorides from raw materials containing valuable metals by leaching the raw material in question into a sulphuric acid solution and by crystallizing the created precious metal sulphate from the solution, whereafter the precious metal sulphate crystals are washed in sulphuric acid solution. Then the dechlorinated and defluorinated crystals are leached into water and conducted into electrolysis. The sulphuric acid solution used both for washing the raw material and for leaching the crystals is advantageously the same as the return acid of the electrolysis. Chlorides and fluorides are removed in a bleed from the mother liquor of the crystallization.

The raw material of most plants producing zinc through electrolysis consists of sulphidic concentrates. The first stage of the process is roasting, where sulphur is removed as sulphur dioxide and zinc turns into an acid soluble oxide. The zinc oxide is leached into the sulphuric acid solution; the resulting zinc sulphate solution is purified and the zinc is precipitated from the solution through electrolysis, so that the sulphate is regenerated into sulphuric acid, which again is conducted back into the oxide leaching stage. This a closed solution circulation is arranged for the process.

One purpose of the hydrometallurgical part of the process is to eliminate most of the harmful elements contained in the raw materials, so that these elements are not concentrated within the solution circuit. Certain elements are, however, so difficult to remove from the solution circuit that so far the only applied method has been to remove them before the oxide leaching stage. Two such harmful elements are chlorine and fluorine, which generally appear as chlorides and fluorides; for the sake of simplicity, these elements are referred to as chlorides and fluorides throughout the description below. Chloride and fluoride are extremely harmful during the electrolytic precipitation. Chloride is harmful mainly to its corrosive effect, but fluoride also makes zinc stick onto the aluminum mother plate. This in its turn prevents the separation of the zinc precipitate from the mother plate and thus makes the whole electrolysis impossible. In the above described method for producing zinc, the chloride and fluoride of the concentrate are removed in the roasting stage and, in addition to this, the further process is observed carefully so as to prevent any use of reagents containing these elements.

Apart from sulphidic elements, there are many other elements containing zinc. In these zinc generally appears as a carbonate or a silicate. Both of these zinc compounds are acid soluble and therefore it would be natural to conduct them directly into the leaching stage without roasting them at all. However, in most cases this simple solution is impossible because of the chloride and fluoride mentioned above—the chloride and fluoride contents are generally too high. In order to solve the problem, it has been suggested that chloride should be removed by means of CuCl and AgCl precipitation or by oxidizing for instance by ozone, in which case the chloride $Cl^-$ of the solution is oxidized into chlorine $Cl_2$ and eliminated from the solution in gasified form. The drawback of this and other prior art methods is the fact that fluoride is not eliminated. Moreover, by oxidizing the solution also manganese is removed, although the presence of manganese during the electrolytic precipitation is absolutely necessary in order to produce lead-free zinc. The above explanation leads to a conclusion that at the moment the possibilities for such raw materials that contain chlorides and fluorides to be directly leached in electrolytic zinc processes are very limited if not altogether impossible.

The purpose of the method of the present invention is to remove the chloride and fluoride contained in the raw material by means of a hydrometallurgical treatment.

BRIEF DESCRIPTION OF DRAWINGS

FIG. 1 is a flow chart of the hydrometallurgical method for treating valuable metal materials containing chlorides and fluorides.

In the process according to the invention, the principal idea whereof is illustrated in FIG. 1, the raw materials containing chloride and fluoride are conducted into the leaching stage 1, where the zinc, as well as the chlorides and fuorides, enter the solution. The undissolved residue is separated by means of generally known methods during the stage 2. Thereafter the solution is conducted into the evaporation and crystallization stage 3, where the zinc is crystallized into pure zinc sulphate which does not contain chloride or fluoride in the crystal lattice; these elements remain in the mother liquor. In the separation stage 4 the pure zinc sulphate crystals are separated by means of generally known methods (thickening, filtering, slinging, etc.). The solution remaining in the crystals, as well as the mother liquor proper which contains chloride and fluoride, are washed in the electrolysis return acid which contains neither Cl nor F. The washed, purified crystals are dissolved into water in the leaching stage 5 of crystals, and the resulting solution is conducted into the customary purification stage 6 and further into the electrolysis 7. The sulphuric acid solution recovered from the electrolysis, which solution is called the return acid, is conducted through the washing and separation stage of the zinc sulphate crystals back into the raw material leaching 1. Thus the return acid is utilized both for washing the crystals and for leaching the raw material. After the separation 4 of crystals the mother liquor containing the chlorides and the fluorides returns, together with the washing solution, back into the raw material leaching 1. This creates a closed circuit wherein the chloride and fluoride remain. In the long run, the chloride and fluoride contents rise so high that it is necessary to remove them. This is carried out so that part of the solution is conducted as a bleed through the removing stage 8 of chlorides and fluorides. In the removing stage 8, various methods can be used in order to achieve the desired degree of separation.

One method for the removal is to draw a bleed from the mother liquor flowing from the crystal separation 4, which bleed is then evaporated in the chloride and fluoride removal 8 until the sulphuric acid content rises so high that the chloride and the fluoride (as HCl and HF) are eliminated (evaporated) from the solution. The degree of evaporation becomes remarkable when the $H_2SO_4$ content rises over 35–40% and the removal is by far complete when the $H_2SO_4$ content is over 70%.

Because the solution will, for practical reasons, contain only some tens of grams of $H_2SO_4$/liter after the evaporation, it is advantageous to add some $H_2SO_4$ into the removing stage 8 in order to achieve the required content more easily. The acid can always be added in the form of the return acid, but because a zinc process of this type generally needs an $H_2SO_4$ addition in any case in order to replace the sulphate losses, the replacement acid can advantageously be put in during this stage. The removal of chloride and fluoride does not have to be complete at this stage; the aim is always to remove just the right amount so that a suitable chloride and fluoride content is maintained within the "chloride and fluoride circuit", which comprises the raw material leaching 1, the leach residue separation 2, the evaporation and crystallization 3, the separation and washing of crystals 4 and the chloride/fluoride removal 8.

Another method of separation is to precipitate the zinc by means of neutralizing the bleed solution entering the chloride/fluoride removal stage 8. After precipitation the precipitate containing zinc is separated from the solution. The precipitate returns into leaching and the solution containing the chlorides and the fluorides is removed from the circuit. This method is recommendable particularly when there is a need also to remove the magnesium contained in the solution. During the precipitation, magnesium remains in the solution in the same way as the chlorides and the fluorides. In case the amount of the solution is small compared to the zinc circuit circulation, and the chloride and fluoride contents are high, several other treatment methods can also be used—these methods being wellknown to professionals.

Although in the above process description reference has been made only to zinc, for professional people it is evident that the same method can be used with other metals such as Ni, Co, Cu, Mn, Mg and Fe. It is also evident that from the point of view of the method the raw material does not necessarily have to be oxidic, carbonaceous or siliceous, but the raw material can also be sulphidic, in which case the leaching may take place for example according to the following formula:

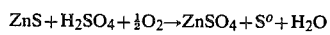

$$ZnS + H_2SO_4 + \tfrac{1}{2}O_2 \rightarrow ZnSO_4 + S^o + H_2O$$

EXAMPLE

An amount of zinc raw material with the following initial contents: Zn 52%, Cl 0.08% and F 0.02%, was fed into the leaching reactor at the speed of 20 t/h. The electrolysis return acid was also conducted into the reactor at the speed of 150 m³/h. When the leach residue was separated from the dissolved raw material, the solution was directed into the evaporation-crystallization reactor in order to create pure zinc sulphate crystals. The created zinc sulphate crystals were extracted from the mother liquor, washed in the return acid, leached into water and conducted, after normal purification, into the electrolysis. In the electrolysis the Cl content was <0.01% and the F content was <0.01%. The major part, roughly 50 m³/h, of the solution recovered from the separation of the zinc sulphate crystals, was conducted along the return acid flow back into the raw material leaching stage but a small bleed, roughly 0.5 m³/h, was directed into the chloride/fluoride removal. That portion of the solution which was fed into the removal stage contained 35 g/l Cl and 9.2 g/l F. In order to speed up the evaporation treatment, replacement acid was directed into the removal stage at the speed of 0.3 t/h, and the temperature was raised up to 80° C. The rate of chlorides (HCl, Cl) removed from the separation stage was 16 kg/h and the rate of fluorides (HF, F) was 4 kg/h. In the solution which was fed into the return acid circulation after evaporation, the contents were: Cl 3.75 g/l, F 1.5 g/l and $H_2SO_4$ 850 g/l.

In the case of the example, the chlorides and fluorides were removed by means of evaporation. This is the most advantageous method if it is not necessary to simultaneously carry out the removal of Mg or other accumulated substances. However, the removal of Mg is often necessary, too, and this would require a larger bleed than the 0.5 m³/h of the example. With a larger bleed, the chloride and fluoride contents in the circulating solution do not rise as high as in the case of this example. Consequently this means that the chloride and fluoride contents are decreased in the electrolysis as well, which of course improves the circumstances during the electrolysis. Thus the circumstances of the example represent a rather disadvantageous case; but, by proving that our method means an improvement compared to the prior art, this practical experiment also proves that the method is undoubtedly valid.

We claim:

1. A hydrometallurgical method for treating valuable metal raw materials containing chlorides and fluorides in order to recover valuable metals selected from the group consisting of Zn, Ni, Co, Cu, Mn, Mg and Fe, free from chloride and fluorides, for electrolytical removal, comprising leaching the valuable metal raw material containing chlorides and fluorides into a sulphuric acid solution, the major portion of which consists of the return acid obtained from the electrolysis, and selectively crystallizing only the valuable metal sulphate from the solution; washing the created sulphate crystals in the electrolysis return acid, and thereafter leaching the dechlorinated and defluorinated valuable metal sulphate crystals into water, and purifying the resulting solution and recovering the valuable metals though electrolysis;

said chlorides and fluorides being removed in a bleed from the mother liquor of the valuable metal crystallization, and wherein sulphuric acid solution is fed into the bleed from the mother liquor crystallization stage to increase the sulfuric acid content thereof, and wherein chlorides and fluorides are removed from the bleed from the mother liquor of the crystallization by means of evaporating them in said increased sulphuric acid content and at an increased temperature.

* * * * *